(12) United States Patent
Pelzl

(10) Patent No.: US 9,403,964 B2
(45) Date of Patent: Aug. 2, 2016

(54) HYDROQUINONE COMPOUNDS FOR REDUCING PHOTOBLUEING OF HALOGEN-CONTAINING POLYMERS

(75) Inventor: Bernhard Pelzl, Graz (AT)

(73) Assignee: Chemson Polymer-Additive AG, Amoldstein (AT)

( * ) Notice: Subject to any disclaimer, the term of this patent is extended or adjusted under 35 U.S.C. 154(b) by 294 days.

(21) Appl. No.: 14/110,096

(22) PCT Filed: Apr. 11, 2012

(86) PCT No.: PCT/EP2012/056540
§ 371 (c)(1),
(2), (4) Date: Jan. 22, 2014

(87) PCT Pub. No.: WO2012/140054
PCT Pub. Date: Oct. 18, 2012

(65) Prior Publication Data
US 2014/0303302 A1    Oct. 9, 2014

Related U.S. Application Data

(60) Provisional application No. 61/473,845, filed on Apr. 11, 2011.

(51) Int. Cl.
| | | |
|---|---|---|
| *C08L 27/06* | (2006.01) | |
| *C08K 5/13* | (2006.01) | |
| *C08K 5/00* | (2006.01) | |
| *C08K 5/08* | (2006.01) | |
| *C08K 13/02* | (2006.01) | |

(52) U.S. Cl.
CPC ................ *C08K 5/13* (2013.01); *C08K 5/0008* (2013.01); *C08K 5/08* (2013.01)

(58) Field of Classification Search
CPC .............. C08K 5/13; C08K 5/00; C08K 5/08; C08K 13/02; C08L 27/06
USPC ............................. 524/347; 568/763; 252/404
See application file for complete search history.

(56) References Cited

U.S. PATENT DOCUMENTS

| | | | |
|---|---|---|---|
| 3,035,056 A | 5/1962 | Symes | |
| 4,039,485 A | 8/1977 | Argabright et al. | |
| 5,232,967 A | 8/1993 | Worschech et al. | |
| 5,312,941 A | 5/1994 | Razvan et al. | |
| 5,356,982 A | 10/1994 | Razvan et al. | |
| 5,519,077 A | 5/1996 | Drewes et al. | |
| 5,543,449 A | 8/1996 | Drewes et al. | |
| 2002/0103089 A1 | 8/2002 | Fukushima et al. | |
| 2003/0209696 A1 | 11/2003 | Reith et al. | |
| 2004/0204522 A1 | 10/2004 | Austen et al. | |
| 2009/0131564 A1 | 5/2009 | Wehner et al. | |
| 2011/0311744 A1 | 12/2011 | Pelzl et al. | |
| 2014/0058020 A1 | 2/2014 | Campbell et al. | |

FOREIGN PATENT DOCUMENTS

| | | | |
|---|---|---|---|
| AU | 2008286385 | 2/2009 | |
| CN | 101 798 428 A | 8/2010 | |
| DE | 41 06 404 C1 | 7/1992 | |
| DE | 41 06 411 C1 | 7/1992 | |
| DE | 42 04 887 A1 | 8/1993 | |
| DE | 10 11 8179 | 10/2002 | |
| DE | 10 2007 037 795 A1 | 2/2009 | |
| DE | 10 2008 0598901 A | 5/2010 | |
| EP | 0 256 872 A2 | 2/1988 | |
| EP | 0 259 783 A2 | 2/1988 | |
| EP | 0 542 720 A1 | 5/1993 | |
| EP | 0542720 A1 * | 5/1993 | ................ C08F 2/42 |
| EP | 0 677 550 A2 | 10/1995 | |
| EP | 0 768 336 | 4/1997 | |
| EP | 1 343 838 | 9/2003 | |
| EP | 1 046 668 B1 | 1/2004 | |
| EP | 1 466 941 A2 | 10/2004 | |
| JP | 53 081592 A | 7/1978 | |
| JP | 60 040146 A | 3/1985 | |
| JP | 05 179090 | 7/1993 | |
| JP | 05 295198 | 11/1993 | |
| JP | 09 062181 | 3/1995 | |
| JP | 11 129409 | 5/1999 | |
| JP | 2001 200374 A | 7/2001 | |
| JP | 2002 080876 A | 3/2002 | |
| WO | WO 02/48249 A2 | 6/2002 | |
| WO | WO 2006/136191 A1 | 12/2006 | |
| WO | WO 2010/060966 A1 | 6/2010 | |

(Continued)

OTHER PUBLICATIONS

Chiron-Charrier, et al. 1993. Application of the study of reactivity of alkaline salts of isocyanuric acid to the synthesis of mono and trisubstituted isocyanurates. Synthetic Communications, Taylor & Francis Group, Philadelphia, PA. vol. 23, No. 19, pp. 2659-2672.
Gächter, R., & Müller, H. 1989. *Kunststoffadditive*. Carl Hanser Verlag, 3rd Ed., pp. 478-488.
S. Cockett et al. Nov. 2005. Photoblueing von PVC-Profilen. Gummi Fasern Kunststoffe, vol. 58, pp. 704-710.
International Search Report mailed Mar. 31, 2010 in PCT Application No. PCT/EP2009/065926, filed Nov. 26, 2009, 4 pages.
International Preliminary Report on Patentability dated Mar. 25, 2011 in PCT Application No. PCT/EP2009/065926, filed Nov. 26, 2009, 5 pages.
International Search Report mailed May 25, 2012 for International Application No. PCT/EP2012/055001 filed Mar. 21, 2012, 4 pages.
International Preliminary Report on Patentability dated Sep. 24, 2012 in PCT Application No. PCT/EP2012/055001, filed Mar. 21, 2012, 6 pages.
International Search Report mailed Jun. 5, 2012 for International Application No. PCT/EP2012/056540 filed Apr. 4, 2012, 3 pages.
Preliminary Amendment filed May 25, 2011 for U.S. Appl. No. 13/131,232 filed Sep. 8, 2011, 9 pages.

(Continued)

*Primary Examiner* — Ling-Siu Choi
*Assistant Examiner* — Ronald Grinsted
(74) *Attorney, Agent, or Firm* — Knobbe Martens Olson & Bear LLP

(57) ABSTRACT

The present invention relates to a stabilizer composition for halogen-containing polymers and polymer mixtures, comprising at least one hydroquinone compound to prevent or reduce photoblueing of the polymers, polymer compositions comprising the stabilizer compositions, and to methods of using the stabilizer compositions.

12 Claims, No Drawings

(56) References Cited

FOREIGN PATENT DOCUMENTS

WO    WO 2012/126948 A1    9/2012
WO    WO 2012/140054 A1    10/2012

OTHER PUBLICATIONS

Restriction Requirement mailed Nov. 26, 2012 for U.S. Appl. No. 13/131,232, filed Sep. 8, 2011, 8 pages.
Response to Restriction Requirement filed Dec. 17, 2012 for U.S. Appl. No. 13/131,232, filed Sep. 8, 2011, 9 pages.
Office Action mailed Mar. 28, 2013 for U.S. Appl. No. 13/131,232, filed Sep. 8, 2011, 8 pages.
Preliminary Amendment filed Sep. 18, 2013 for U.S. Appl. No. 14/006,092, filed Sep. 18, 2013, 10 pages.
Reply to Office Action filed Sep. 27, 2013 for U.S. Appl. No. 12/131,232, filed Sep. 8, 2011, 13 pages.
Notice of Allowance mailed Mar. 3, 2014 for U.S. Appl. No. 13/131,232, filed Sep. 8, 2011, 12 pages.
Unpublished Experimental Results, Sep. 20, 2013.
Office Action mailed Apr. 18, 2014 for U.S. Appl. No. 14/006,092, filed Nov. 6, 2013, 12 pages.

* cited by examiner

HYDROQUINONE COMPOUNDS FOR REDUCING PHOTOBLUEING OF HALOGEN-CONTAINING POLYMERS

CROSS-REFERENCE TO RELATED APPLICATIONS

This application is the U.S. National Phase of Application No. PCT/EP2012/056540 entitled "HYDROQUINONE COMPOUNDS FOR REDUCING PHOTOBLUEING OF HALOGEN-CONTAINING POLYMERS" filed Apr. 11, 2012 and published in English on Oct. 18, 2012 as WO 2012/140054 which claims the benefit of priority of U.S. provisional application No. 61/473,845 filed Apr. 11, 2011, entitled "Mechanism and efficient reduction of photoeffects in stabilization of profiles". The entire content of said application filed on Apr. 11, 2011 is incorporated herein by reference for all purposes, including an incorporation of any element or part of the description, claims or drawings not contained herein and referred to in Rule 20.5(a) of the PCT, pursuant to Rule 4.18 of the PCT.

FIELD OF THE INVENTION

The present invention relates to the use of hydroquinone compounds for the reduction of photoeffects in halogen-containing polymers, stabilizer composition for halogen-containing polymers and polymer mixtures, comprising at least one such hydroquinone compound, polymer compositions comprising the stabilizer compositions, and to methods of using the stabilizer compositions.

BACKGROUND

Halogen-containing polymers or plastics or molded articles produced therefrom tend to undergo substantial changes during their production process and under environmental influences. For example, they tend to decompose and degrade under the influence of heat and/or light. The degradation of such halogen-containing polymers, in particular PVC, produces halogenic acid (in case of PVC hydrochloric acid), which is eliminated from the polymer strands, resulting in a discolored, unsaturated plastic having chromophoric polyene sequences.

To avoid these undesirable changes, it is common practice in the art to add stabilizers to these polymers that at least partially prevent decomposition and/or discoloration first during the production process and then later on during the lifetime of the product. In the past, toxic heavy metal-containing compounds, such as lead, barium or cadmium containing compounds, have been used as stabilizers. However, due to the toxicity and environmental concerns, in the recent years, attempts have been made to find alternative stabilizers. Today a growing number of heavy metal-free stabilizer compositions is available, including among others, hydrotalcites, perchlorates, alkaline earth metal oxides, hydroxides and carboxylates, etc. Other known stabilizers include nitrogen-containing compounds, such as aminouracils and isocyanurates.

Photoblueing, i.e. a light-induced color shift to blueish colors, occurs when halogen-containing polymer products, in particular PVC products, are irradiated by sunlight in the first hours after production. This phenomenon is an issue for PVC window profiles, because it is desirable that the tone should fit to profiles from different batches when confected. The photoblueing effect, which is manifested by a decrease in the b value (of the Lab color space), can be influenced by different components in the polymer composition. One example of a compound that influences the photoblueing behaviour is the white pigment titanium dioxide. Interestingly, the modification of titanium dioxide, i.e. whether it is present in the rutile or anatase modification, also influences the photoblueing effect. In addition, the type of stabilizer used to stabilize the halogen-containing polymer can influence photoblueing behaviour.

In contrast, the type of polymer, in particular the PVC type, commonly used fillers and modifiers, and the nitrogen and oxygen concentrations in the environment, do not significantly affect photoblueing behaviour.

Although high amounts of antioxidants or protection of the polymer products from light, in particular sunlight, can decrease or prevent photoblueing, it would be desirable to have compounds available that can prevent or compensate for the color change. Accordingly, there is need in the art for compositions and methods that can reduce the photoblueing effect.

SUMMARY OF THE INVENTION

One object of the present invention was to meet this need by providing a compound that satisfies the needs identified above and can, for example, be used as a component of conventional stabilizer compositions for halogenated polymers.

Another object of the invention was to provide a polymer composition that comprises such a compound or stabilizer composition and methods of stabilizing halogen-containing polymers by use of the inventive compounds or stabilizer compositions as well as providing molded polymer products that include these compounds or compositions.

The objects of the invention are achieved by the compositions, methods and uses, as described below.

In a first aspect, the present invention is directed to a stabilizer composition for halogen-containing polymers, comprising at least one hydroquinone compound of formula I:

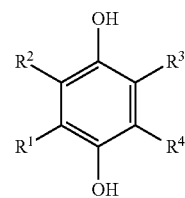

Formula I wherein $R^1$, $R^2$, $R^3$ and $R^4$ are independently selected from the group consisting of hydrogen, halogen, hydroxy, cyano, nitro, sulfonyl, phosphoryl, optionally substituted alkyl, optionally substituted alkenyl, optionally substituted alkynyl, optionally substituted cycloalkyl, optionally substituted heterocyclyl, optionally substituted aryl, optionally substituted heteroaryl, optionally substituted alkoxy, —C(O)R, and —NR'R";

R is selected from the group consisting of hydrogen, hydroxy, alkyl, alkenyl, alkynyl, alkoxy, aryl, heteroaryl, cycloalkyl, heterocyclyl, and —NR'R"; and R' and R" are independently selected from the group consisting of hydrogen, alkyl, alkenyl, alkynyl, aryl, heteroaryl, cycloalkyl, and heterocyclyl.

In certain embodiments, the halogen-containing polymer is polyvinylchloride.

In various embodiments of the stabilizer composition, $R^1$-$R^4$ are hydrogen or alkyl. Alternatively, one, two or three of $R^1$-$R^4$ are alkyl with the others being hydrogen. In specific embodiments, the compound is selected from the group consisting of hydroquinone, 2-methyl-hydroquinone, 2,5-di-tert-butyl-hydroquinone.

The stabilizer composition of the invention may comprise at least one additional stabilizer compound for halogen-containing polymers. The stabilizer compound may be a primary stabilizer or co-stabilizer. For example, in various embodiments, the primary stabilizer or co-stabilizer are selected from the group consisting of 1,3-diketone compounds, polyols, metal salts, natural or synthetic minerals, organic esters of phosphorous acid, epoxy compounds, salts of halogen-containing oxy acids, nitrogen-containing compounds, and combinations thereof. Suitable stabilizers include, among others, hydrotalcites, perchlorates, alkaline earth metal oxides, hydroxides and carboxylates, amino acid derivatives, amino alcohols, aminouracils and isocyanurates.

In various embodiments of the invention, the stabilizer composition further comprises one or more additional components. Such components may be selected from the group consisting of zeolites, antioxidants, fillers, plasticizers, dyestuffs, pigments, antistatic agents, surfactants, blowing agents, impact modifiers, UV stabilizers, lubricants, processing agents and other auxiliaries.

In various embodiments, the stabilizer composition further comprises a pigment, such as titanium dioxide. The titanium dioxide may be used in its rutile or anatase modification or a mixture of both modifications.

In a second aspect, the present invention relates to a polymer composition comprising a halogen-containing polymer and a stabilizer composition according to the invention. The halogen-containing polymer may be a thermoplastic, for example polyvinylchloride.

In various embodiments, the polymer composition can further comprise one or more additional components selected from the group consisting of stabilizers, zeolites, antioxidants, fillers, plasticizers, dyestuffs, pigments, antistatic agents, surfactants, blowing agents, impact modifiers, UV stabilizers, lubricants, processing agents and other auxiliaries.

The amount of stabilizer composition in the polymer composition may, in various embodiments, range from about 0.001 to 20 per hundred halogen-containing polymer resin (phr). In certain embodiments, the amount of the stabilizer composition may be chosen such that the amount of the at least one hydroquinone compound is between 0.001 and 1 phr, for example between 0.005 and 0.3 phr.

In a still further aspect, the present invention is directed to a molded article comprising or consisting of the polymer composition of the invention. The molded article may, for example, be a window profile.

In another aspect, the present invention relates to a method for reducing or preventing photoblueing of a halogen-containing polymer, comprising contacting the halogen-containing polymer with the stabilizer composition according to the invention. The contacting may occur by adding the stabilizer composition to the halogen-containing polymer before curing. The adding step may including mixing.

In a still further aspect, the invention is directed to the use of the stabilizer composition of the invention for reducing or preventing photoblueing of a halogen-containing polymer.

In all above aspects, the halogen-containing polymer may be polyvinylchloride.

DETAILED DESCRIPTION

The present invention is based on the finding that the photoblueing effect observed in halogen-containing polymers when exposed to sunlight shortly after production can be prevented or compensated for by adding hydroquinone compounds to the polymer compositions. It is hypothesized that this effect is due to a compensation effect mediated by the yellow color of the benzoquinone compounds that are generated upon light exposure of the hydroquinones, with this yellow color compensating for the photoblueing effect.

The present invention in a first aspect therefore concerns a stabilizer composition for reducing or preventing photoblueing of halogen-containing polymers upon light irradiation, wherein the stabilizer composition comprises at least one hydroquinone compound.

In various embodiments of the invention, the hydroquinone compound is a compound of formula I:

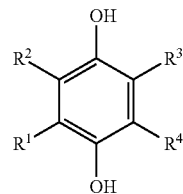

Formula I wherein
$R^1$, $R^2$, $R^3$ and $R^4$ are independently selected from the group consisting of hydrogen, halogen, hydroxy, cyano, nitro, sulfonyl, phosphoryl, optionally substituted alkyl, optionally substituted alkenyl, optionally substituted alkynyl, optionally substituted cycloalkyl, optionally substituted heterocyclyl, optionally substituted aryl, optionally substituted heteroaryl, optionally substituted alkoxy, —C(O)R, and —NR'R";
R is selected from the group consisting of hydrogen, hydroxy, alkyl, alkenyl, alkynyl, alkoxy, aryl, heteroaryl, cycloalkyl, heterocyclyl, and —NR'R"; and
R' and R" are independently selected from the group consisting of hydrogen, alkyl, alkenyl, alkynyl, aryl, heteroaryl, cycloalkyl, and heterocyclyl.

In various embodiments, $R^1$-$R^4$ are hydrogen or alkyl. In various embodiments, one, two or three, preferably one or two, of $R^1$-$R^4$ are alkyl with the others being hydrogen. In specific embodiments, the compound is selected from the group consisting of hydroquinone, 2-methyl-hydroquinone, 2,5-di-tert-butyl-hydroquinone.

Examples of halogen-containing polymers can be thermoplastic halogen-containing polymers, for example, without being limited thereto, polyvinyl chloride (PVC), polyvinylidene chloride, chlorinated or chlorosulfonated polyethylene, chlorinated poly-propylene or chlorinated ethylene/vinyl acetate copolymer or similar compounds. Polymers of the PVC type, i.e. vinyl chloride homopolymers and copolymers of vinyl chloride with other monomers, are preferred.

As used herein, a "stabilizer composition" is to be understood as being a composition that can be used for stabilizing halogen-containing polymers. In the sense of the present invention, the stabilizing effect includes the prevention or reduction of photoblueing, which may not only be achieved by stabilizing the polymer but also by compensating for the color change (photoblueing). For achieving such stabilizing effect, a stabilizer composition according to the invention may be mixed with a halogen-containing polymer to be stabilized and then the polymer is processed. It is equally possible, however, for a stabilizer composition according to the invention to be mixed with the halogen-containing polymer during processing.

The term "alkyl", as used herein, relates to completely saturated aliphatic, linear or branched hydrocarbons. In particular embodiments, an alkyl contains 1 to 20 carbon atoms. A numerical range of from, for example, 1 to 20 means that, for example, $C_1$-$C_{20}$ alkyl relates to an alkyl group which contains 1, 2, 3, 4, 5, 6, 7, 8, 9, 10, 11, 12, 13, 14, 15, 16, 17, 18, 19 or 20 carbon atoms. The alkyl group can be a lower alkyl group and have 1-6 or 1-4 carbon atoms. The alkyl group can be optionally substituted, with the substituents as defined below. Examples of alkyl compounds include, but are not limited thereto, methyl, ethyl, n-propyl, isopropyl, n-butyl, isobutyl, sec-butyl, tert-butyl, pentyl, hexyl, heptyl, octyl and the like.

The term "alkenyl", as used herein, relates to aliphatic hydrocarbons having one or more double bonds. In particular embodiments an alkenyl contains 2 to 20 carbon atoms. The alkenyl group can also be a lower alkenyl and comprise 2 to 6 or 2 to 4 carbon atoms. The alkenyl group can be optionally substituted. Examples of alkenyl compounds include, but are not limited thereto, ethenyl, propenyl, 1,4-butadienyl and the like.

The term "alkynyl", as used herein, relates to aliphatic hydrocarbons having one or more triple bonds. In particular embodiments an alkynyl contains 2 to 20 carbon atoms. The alkynyl group can also be a lower alkenyl and comprise 2 to 6 or 2 to 4 carbon atoms. The alkynyl group can be optionally substituted. Examples of alkynyl compounds include, but are not limited thereto, ethynyl, propynyl and the like The term "alkoxy", as used herein, relates to aliphatic hydrocarbons having an —O-alkyl unit. In such units, the alkyl moiety is defined as described above. In particular embodiments an alkoxy contains 1 to 6 carbon atoms, i.e. 1, 2, 3, 4, 5 or 6 carbon atoms. The alkoxy group can be optionally substituted.

Examples of alkoxy compounds include, but are not limited thereto, methoxy, ethoxy, propoxy, tert-butoxy and the like.

The term "cycloalkyl", as used herein, relates to cyclic saturated hydrocarbons. In particular embodiments a cycloalkyl contains 5 to 20 carbon atoms, i.e. 5, 6, 7, 8, 9, 10, 11, 12, 13, 14, 15, 16, 17, 18, 19 or 20 carbon atoms. The cycloalkyl group can be optionally substituted. If substituted with an alkyl group, the cycloalkyl group may be an alkylcycloalkyl group. Examples of cycloalkyl compounds include, but are not limited thereto, cyclopentane, cyclohexane, cycloheptane, cyclooctane and the like.

The term "alkylcycloalkyl", as used herein, relates to cyclic saturated hydrocarbons which are bonded to the core ring structure via an alkyl group. In particular embodiments an alkylcycloalkyl contains 4 to 20 carbon atoms. The alkylcycloalkyl group can be optionally substituted. Examples of alkylcycloalkyl compounds include, without being limited thereto, glycidyl and the like.

The terms "heterocyclyl" and "heterocycloalkyl", as interchangeably used herein, relate to cyclic saturated hydrocarbons that comprise one or more heteroatoms. The heteroatoms may be selected from oxygen, nitrogen, phosphorus and sulfur, but is not limited thereto. In particular embodiments a heterocycloalkyl contains 2 to 5 carbon atoms and 1 to 3 heteroatoms. The heterocycloalkyl group can be optionally substituted. The heterocycloalkyl group can be substituted by an alkyl group to form an alkylheterocycloalkyl group. One exemplary group is 2,3-epoxypropanyl.

The term "aryl", as used herein, relates to an aromatic ring in which each ring atom is a carbon atom. Aryl rings can be built up from five, six, seven, eight, nine, ten or more carbon atoms. For example, aryl compounds can have up to 15 carbon atoms. The aryl group can be optionally substituted. Examples of aryl compounds include, but are not limited thereto, cyclopentadienyl, phenyl, and the like.

The term "heteroaryl", as used herein, relates to an aromatic heterocycle, wherein the heteroaryl rings can be built up from 5, 6, 7, 8, 9 or more atoms, at least ring atom being a hetero atom. The at least one hetero atom can be chosen from oxygen, nitrogen, sulfur and phosphorus, but is not limited thereto. The heteroaryl group can be optionally substituted. Examples of heteroaryl compounds include, but are not limited thereto, furan, pyridine, thiophene and the like.

"Halogen", as used herein, relates to fluorine, chloride, bromine and iodine.

"Hydroxy", as used herein, relates to the group —OH.

"Cyano", as used herein, relates to the group —CN.

"Nitro", as used herein, relates to the group —$NO_2$.

"Sulfonyl", as used herein, relates to the group —$S(O)_2$—R, with R defined as above.

"Phosphoryl", as used herein, relates 10 the group —$P(O)R_2$, with each R independently being defined as above.

The term "optionally substituted" relates to a group in which one or more hydrogen atoms are replaced by a substituent. The substituent can be selected from the group consisting of alkyl, alkenyl, alkynyl, alkoxy, cycloalkyl, heterocycloalkyl, aryl, heteroaryl, OH, CN, halogen, nitro, carboxy, sulfonyl, phosphoryl, and amino, but is not limited thereto. The substituent groups can be defined as described above.

The stabilizer compositions according to the present invention can be added to the halogen-containing polymer in various amounts. In various embodiments, it can be added in an amount of from about 0.001 to about 20.0 part per 100 parts of resin ("per hundred of resin"=phr), from about 0.01 to about 10.0 parts per 100 parts of resin (phr), preferably in an amount of from about 0.05 to about 8.0 phr, more preferably in an amount of from about 0.5 to about 5.0 phr. In various embodiments, the amount is selected such that the amount of the at least one hydroquinone compound is between about 0.001 to about 1 parts per 100 parts of resin (phr). In one embodiment, the hydroquinone compound can be added in an amount of from about 0.005 to about 0.3 phr, for example in an amount of from about 0.01 to about 0.2 phr, for example about 0.05, 0.1, or 0.15 phr. In various embodiments, the amount of the stabilizer composition is selected such that the amount of the at least one hydroquinone compound in the stabilizer composition is selected such that upon light irradiation it develops a color that compensates for the photoblueing of the halogen-containing polymer composition upon light irradiation.

The stabilizer composition can comprise additional stabilizers and/or other auxiliaries, as described below. These may be present in a ready-to-use formulation of the stabilizer composition or may be added separately to the polymer or the polymer mixture upon use.

In various embodiments, the stabilizer composition according to the invention can comprise one or more of the following additional additives, such as, for example, primary stabilizers, co-stabilizers, zeolites, antioxidants, fillers, plasticizers, dyestuffs, pigments, antistatic agents, surfactants, blowing agents, impact modifiers, UV stabilizers, lubricants, processing agents or the like.

Co-stabilizers are compounds which provide a further stabilizing contribution for halogen-containing polymers when used in the stabilizer composition according to the present invention. Possible co-stabilizers can be chosen from the group consisting of 1,3-diketone compounds, polyols, metal salts, natural or synthetic minerals, such as hydrotalcites, hydrocalumites and zeolites, amino acid derivatives, organic esters of phosphorous acid, epoxy compounds, salts of halogen-containing oxy acids, such as perchlorates, and EDTA.

Examples of 1,3-diketone compounds include, but are not limited thereto, dibenzoylmethane, stearoylbenzoyl-methane, palmitoylbenzoylmethane, myristoylbenzoyl-methane, lauroylbenzoylmethane, benzoylacetone, acetyl-acetone, tribenzoylmethane, diacetylacetobenzene, p-methoxystearoylacetophenone, acetoacetic acid esters and acetylacetone and metal salts thereof, in particular those of lithium, sodium, potassium, calcium, magnesium, titanium and/or aluminum.

Co-stabilizers from the group of polyols include, but are not limited thereto, glycerol, pentaerythritol, di- and tripentaerythritol, trismethylolpropane (TMP), di-TMP, sorbitol, sorbite, isosorbid, mannitol, malititol, saccharides, disaccharides (in particular sucrose, 4-O-[beta]-D-galactoyranosyl-D-glucose, 4-O-alpha-D-glucopyranosyl-D-glucose, 6-O-(6-deoxy-alpha-L-mannopyranosyl)-D-glucose, alpha-D-glucopyranosyl-alpha-D-gluco-pyranoside, 6-O-alpha-D-glucopyranosyl-D-glucose, 4-O-[beta]-D-glucopyranosyl-D-glucose, 2-O-[beta]-D-glucopyranosyl-D-glucose, 6-O-alpha-D-glucopyranosyl-D-glucitol, 3-O-alpha-D-glucopyranosyl-D-fructose, 6-O-[beta]-D-gluco-pyranosyl-D-glucose, 4-O-[beta]-D-galactopyranosyl-D-glucitol, 4-O-alpha-D-glucopyranosyl-D-glucitol, 6-O-alpha-D-galactopyranosyl-D-glucose, 3-O-alpha-D-galactopyranosyl-D-myo-inositol, 4-O-[beta]-D-galactopyranosyl-D-fructose, 4-O-[beta]-D-galactopyranosyl-[beta]-D-glucopyranose, 6-O-alpha-D-glucopyranosyl-D-fructose, 4-O-[beta]-D-galactopyranosyl-alpha-D-glucopyranose, 2-O-(6-deoxy-alpha-L-mannopyranosyl)-D-glucose, 4-O-alpha-D-glucopyranosyl-D-fructose, 2-O-[beta]-D-glucopyranosyl-alpha-D-glucopyranose, 1-O-alpha-D-glucopyranosyl-D-mannitol, 6-O-(6-deoxy-alpha-L-mannopyranosyl)-[beta]-D-glucopyranose, 2-O-[beta]-D-glucopyranosyl-[beta]-D-gluco-pyranose, 6-O-alpha-D-glucopyranosyl-alpha-6-gluco-pyranose, 2-O-alpha-D-glucopyranosyl-alpha-D-gluco-pyranose, 2-O-alpha-D-glucopyranosyl-[beta]-D-glucopyranose, 1-O-alpha-D-glucopyranosyl-D-fructose, 6-O-alpha-D-glucopyranosyl-alpha-D-fructofuranose, 6-O-alpha-D-glucopyranosyl-D-glucitol, 4-O-[beta]-D-galactopyranosyl-D-glucitol, 4-O-alpha-D-glucopyranosyl-D-glucitol, 1-O-alpha-D-glucopyranosyl-D-mannitol), trisaccharides, polysaccharides, in particular polyvinyl alcohols, starch, cellulose and partial esters thereof.

Exemplary salts of a halogen-containing oxy acid include inorganic or organic salts of perchloric acid. Examples of suitable inorganic perchlorates are those of the general formula $M(ClO_4)_k \cdot xH_2O$, wherein M is Li, Na, K, Mg, Ca, Sr, Zn, Al, La or Ce, k is depending on the valency of the metal 1, 2, 3 or 4 and x is 0 or an integer from 1 to 10.

Suitable organic perchlorates include the onium salts of perchlorates, as described below. In the context of the present invention, the term "onium salt" denotes a compound that is an ammonium, sulfonium or phosphonium salt. An "onium salt" in accordance with the present invention is an organic onium salt. That means that the ammonium, sulfonium or phosphonium group of the onium salt carries at least one organic radical. An onium salt may carry 1, 2, 3 or 4 organic radicals according to the nature of the onium salt. The organic radicals can be bonded to the onium radical, for example, by way of a C—X linkage, where X is S, N or P. It is equally possible, however, for the organic radicals to be bonded to the onium radical by way of a further hetero atom, for example an O atom.

Examples of co-stabilizers from the group of metal salts include, but are not limited thereto, hydroxides, oxides, carbonates, basic carbonates and carboxylic acid salts of alkali metals, alkaline earth metal, aluminum, lead, zinc, and titanium. The alkali and alkaline earth metals include lithium, sodium, potassium, magnesium and calcium. In one embodiment of the present invention, the metal salts can be salts of carboxylic acids, for example $C_2$-$C_{22}$-carboxylic acids, preferably higher carboxylic acids, such as, for example, stearic, palmitic, myristic, lauric, oleic, oleinic and ricinoleic acid.

In various embodiments of the invention, a stabilizer composition according to the invention comprises at least one basic calcium salt. Suitable basic calcium salts are, for example, calcium oxide, calcium carbonate and calcium hydroxide. The basic calcium salts may optionally have been surface-modified.

A stabilizer composition according to the invention can comprise the mentioned metal oxides, metal hydroxides or metal soaps, or a mixture of two or more thereof, in an amount of up to about 50% by weight, for example in an amount of up to about 30% by weight Examples of natural and synthetic minerals include, but are not limited thereto, A3-, A4-, A5-zeolites, zeolites of the mordenite, erionite, faujasite X or Y type and ZSM-5-zeolites, hydrotalcites (of the Alcamizer 1 and 4 type) and/or mixtures thereof. Further suitable hydrotalcites, zeolites and alkali alumocarbonates are described, for example, on pages 27 to 29 of EP-A 1 046 668, on pages 3, 5 and 7 of EP-A 256 872, on pages 2 and 3 of DE-C 41 06 411 or on pages 2 and 3 of DE-C 41 06 404. The hydrotalcites, zeolites and alkali alumocarbonates suitable as additives can be present in a stabilizer composition according to the invention in an amount of up to about 50% by weight, for example up to about 30% by weight.

Examples of co-stabilizers from the group of amino acid derivatives include, but are not limited thereto, glycine, alanine, lysine, tryptophan, acetylmethionine, pyrrolidonecarboxylic acid, [alpha]-aminocrotonic acid, [alpha]-aminoacrylic acid, [alpha]-aminoadipic acid, indol-, pyrimidine- and urea-derivatives and the like, and the corresponding esters thereof. The alcohol components of these esters can include monofunctional alcohols, such as, for example, methyl alcohol, ethyl alcohol, propyl alcohol, i-propyl alcohol, butyl alcohol, [alpha]-ethylhexanol, octyl alcohol, i-octyl alcohol, lauryl alcohol, stearyl alcohol and the like, and polyols, such as, for example, ethylene glycol, propylene glycol, 1,3-butanediol, 1,4-butanediol, glycerol, diglycerol, trismethylolpropane, pentaerythritol, dipentaerythritol, erythritol, sorbitol, mannitol and the like.

Examples of co-stabilizers from the group of esters of phosphorous acid include, but are not limited thereto, triaryl phosphites, such as, for example, triphenyl phosphite, tris(p-nonylphenyl) phosphite; alkyl aryl phosphites, such as, for example, monoalkyl diphenyl phosphites, e.g. diphenyl isooctyl phosphite, diphenyl isodecyl phosphite; and dialkyl monophenyl phosphites, such as, for example, phenyl diisooctyl phosphite, phenyl diisodecyl phosphite; and trialkyl phosphites, such as triisooctyl phosphite, tristearyl phosphite and the like.

Examples of co-stabilizers from the group of epoxy compounds include, but are not limited thereto, various animal and plant oils, such as, for example, epoxidised soybean oil, epoxidised olive oil, epoxidised linseed oil, epoxidised castor oil, epoxidised groundnut oil, epoxidised maize oil, epoxidised cottonseed oil, epoxidised-rape oil, epoxidized carboxylic acid esters, such as, for example, epoxidized epoxymethyl oleate, epoxybutyl oleate, epoxidized alicyclic compounds, glycidyl ethers, such as, for example, bisphenol A diglycidyl ether, bisphenol F diglycidyl ether; glycidyl esters, such as glycidyl acrylate, glycidyl methacrylate, their polymers, copolymers; and epoxidized polymers, such as epoxidized polybutadiene, epoxidized ABS, and the like. Further suitable epoxy compounds are described, for example, on pages 3 to 5 of EP-A 1 046 668.

Also suitable as additives in the context of the present invention are, for example, amino alcohols. Suitable amino alcohols in the context of the present invention are in principle any compounds having at least one OH group and a primary, secondary or tertiary amino group or a combination of two or more of the mentioned amino groups. Suitable amino alcohols are, for example, mono- or poly-hydroxy compounds which are based on linear or branched, saturated or unsaturated aliphatic mono- or poly-amines. There are suitable in this connection, for example, OH-group-carrying derivatives of primary mono- or poly-amino compounds having from 2 up to about 40, for example from 6 up to about 20, carbon atoms. Examples thereof are corresponding OH-group-carrying derivatives of ethylamine, n-propylamine, isopropylamine, sec-propylamine, tert-butylamine, 1-aminoisobutane, and substituted amines having from 2 to about 20 carbon atoms, such as 2-(N,N-dimethylamino)-1-aminoethane. Suitable OH-group-carrying derivatives of diamines are, for example, those based on diamines having a molecular weight of from about 32 to about 200 g/mol, the corresponding diamines having at least two primary, two secondary, or one primary and one secondary amino group(s). Examples thereof are diaminoethane, the isomeric diaminopropanes, the isomeric diaminobutanes, the isomeric diaminohexanes, piperazine, 2,5-dimethyl-piperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines, such as diethylenetriamine or 1,8-diamino-4-aminomethyloctane, triethylamine, tributylamine, dimethylbenzylamine, N-ethyl-, N-methyl-, N-cyclohexyl-morpholine, dimethylcyclohexylamine, dimorpholinodiethyl ether, 1,4-diazabicyclo[2.2.2]octane, 1-azabicyclo[3.3.0]octane, tetramethylethylenediamine, N,N,N',N'-tetramethylbutanediamine, N,N,N',N'-tetramethyl-1,6-hexanediamine, pentamethyldiethylenetriamine, tetramethyldiaminoethyl ether, bis(dimethylaminopropyl)urea, N,N'-dimethylpiperazine, 1,2-dimethylimidazole or di(4-N,N-dimethylaminocyclohexyl)methane.

Especially suitable are aliphatic amino alcohols having from 2 to about 40, preferably from 6 to about 20, carbon atoms, for example 1-amino-3,3-dimethyl-pentan-5-ol, 2-aminohexane-2',2"-diethanolamine, 1-amino-2,5-dimethylcyclohexan-4-ol, 2-aminopropanol, 2-aminobutanol, 3-aminopropanol, 1-amino-2-propanol, 2-amino-2-methyl-1-propanol, 5-aminopentanol, 3-aminomethyl-3,5,5-trimethylcyclohexanol, 1-amino-1-cyclopentane-methanol, 2-amino-2-ethyl-1,3-propanediol, 2-(dimethylaminoethoxy)-ethanol, aromatic-aliphatic or aromatic-cycloaliphatic amino alcohols having from 6 to about 20 carbon atoms, there coming into consideration as aromatic structures heterocyclic or isocyclic ring systems such as naphthalene derivatives or, especially, benzene derivatives, such as 2-aminobenzyl alcohol, 3-(hydroxymethyl)aniline, 2-amino-3-phenyl-1-propanol, 2-amino-1-phenylethanol, 2-phenylglycinol or 2-amino-1-phenyl-1,3-propanediol, and also mixtures of two or more such compounds.

Within the scope of an especially preferred embodiment of the present invention, the amino alcohols used are heterocyclic compounds having a cyclic ring system containing amino groups, the OH groups being bonded to the ring either directly or preferably by way of spacers. Within the scope of an especially preferred embodiment of the present invention there are used heterocyclic amino alcohols that have at least 2, preferably at least 3, amino groups in the ring. As central ring component of the amino alcohols suitable for use according to the invention there are especially suitable the trimerisation products of isocyanates.

Special preference is given to hydroxyl-group-containing isocyanurates, in particular tris(hydroxymethyl)isocyanurate (THEIC).

Further suitable co-stabilizers include, but are not limited to 2-[2-[bis(carboxymethyl)amino]ethyl-(carboxymethyl) amino]acetic acid (EDTA), N,N'-ethylenediamine disuccinic acid, 2-[2-[2-[2-[bis(carboxymethyl)amino]ethoxy]ethoxy] ethyl-(carboxymethyl)amino]acetic acid, citric acid as well as salts or derivatives thereof.

Examples of antioxidants comprise, but are not limited thereto, alkylphenols, hydroxyphenyl propionates, hydroxybenzyl compounds, alkylidenebisphenols, thiobisphenols and aminophenols, in particular e.g. 2,6-di-tert-butyl-4-methylphenol, 2,6-dibenzyl-4-methylphenol, stearyl butyl-4'-hydroxyphenyl)propionate, 4,4'-thiobis(3-methyl-6-tert-butylphenol), 4-nonylphenol, 2,2'-methylenebis(4-methyl-6-tert-butylphenol), 2,5-di-tert-butyl-hydroquinone, 4,4',4"-(1-thethyl-1-propenyl-3-ylidene)-tris[2-(1,1-dimethylethyl)-5-methylphenol], neutral or basic lithium, magnesium, calcium and aluminum salts thereof, and sterically hindered amines and/or phosphonites and mixtures thereof.

Exemplary fillers include, but are not limited to chalk, gypsum, dolomite, wollastonite, magnesium oxide, magnesium hydroxide, silicates, glass fibres, talc, kaolin, in pure or coated form, as well as carbon black or graphite, wood flour or other renewable raw materials.

Pigments that may be added to the stabilizer compositions of the invention include, but are not limited to titanium dioxide, in particular in its anatase and/or rutile modification form. Further examples of suitable inorganic pigments include, but are not limited to, carbon black, $Fe_2O_3$, $Sb_2O_3$, $(Ba, Sb)O_2$, $Cr_2O_3$, spinels, such as cobalt blue and cobalt green, Cd (S, Se) or ultramarine blue. Suitable organic pigments are, for example, azo pigments, phthalocyanine pigments, quinacridone pigments, perylene pigments, diketopyrrolopyrrole pigments or anthraquinone pigments.

Paraffin wax can be used, for example, as a lubricant. In one embodiment, the paraffin wax can be a mixture of alkanes with the general empirical formula $C_nH_{2n+2}$. n is an integer from 20 to 100. The mixture can comprise both straight-chain and branched-chain components, and also purely straight-chain components.

Other suitable lubricants include, but are not limited to, polyethylene waxes, polypropylene waxes, montan waxes, ester lubricants, such as fatty acid esters, purified or hydrogenated natural or synthetic triglycerides or partial esters, amide waxes, chloroparaffins, glycerol esters or alkaline earth soaps. Lubricants suitable for use are also described in "Kunststoffadditive", R. Gächter/H. Müller, Carl Hanser Verlag, 3rd edition, 1989, pages 478-488. Also suitable as lubricants are, for example, fatty ketones, as described in DE 4,204,887, and also silicone-based lubricants, as mentioned, for example, in EP-A 0 259 783, or combinations thereof as mentioned in EP-A 0 259 783. A stabilizer composition according to the invention can comprise the described lubricants in an amount of from 0 up to about 70% by weight, especially up to about 40% by weight Fillers can be used in an amount of from approximately 0 to approximately 100 phr or from approximately 1 to approximately 50 phr. In one embodiment of the present invention, fillers can be used in an amount of from approximately 2 to approximately 20 phr. Plasticizers can be used in an amount of from approximately 0 to approximately 100 phr, for example from approximately 0.05 to approximately 50 phr. Lubricants can be used in an amount of from approximately 0.05 to approximately 3 phr, for example from approximately 0.1 to approximately 2 phr.

The co-stabilizers described above can be used in identical amounts to the lubricants.

As described above, in various embodiments the compositions can comprise one or more blowing agents. Blowing agents suitable for use in the compositions of the invention include, but are not limited to organic azo and hydrazo compounds, tetrazoles, oxazines, isatoic anhydride, salts of citric acid, for example ammonium citrate, and also sodium carbonate and sodium hydrogen carbonate. Especially suitable are, for example, ammonium citrate, azodicarbonamide or sodium hydrogen carbonate or mixtures of two or more thereof. Also suitable are physical blowing agents, such as liquids that pass into the gaseous state when the temperature is suitably increased or gases, for example water, $CO_2$ (supercritical), air or inert gases such as hydrogen, helium, argon or the like.

The proportion of blowing agents in a stabilizer composition according to the invention is preferably from about 0.01 to about 20% by weight, for example from about 0.1 to about 10% by weight or from about 0.5 to about 5% by weight.

Suitable as plasticisers are, for example, compounds from the group of phthalic acid esters, such as di-2-ethylhexyl, di-n-octyl, diisooctyl, diisononyl, diisodecyl, dicyclohexyl, dimethylcyclohexyl, dimethyl glycol, dibutyl glycol, benzylbutyl or diphenyl phthalate and also mixtures of phthalates, for example mixtures of alkyl phthalates having from 7 to 9 or 9 to 11 carbon atoms in the ester alcohol or mixtures of alkyl phthalates having from 6 to 10 and 8 to 10 carbon atoms in the ester alcohol.

Especially suitable in the sense of the present invention are di-2-ethylhexyl, di-n-octyl, diisooctyl, diisononyl, diisodecyl, diisotridecyl and benzylbutyl phthalate and also the mentioned mixtures of alkyl phthalates.

Also suitable as plasticisers are the esters of aliphatic dicarboxylic acids, especially the esters of adipic, azelaic, sebacic acid or citric acid or mixtures of two or more thereof. Examples of such plasticisers are di-2-ethylhexyl adipate, diisooctyl adipate, diisononyl adipate, diisodecyl adipate, benzylbutyl adipate, benzyloctyl adipate, di-2-ethylhexyl azelate, di-2-ethylhexyl sebacate and diisodecyl sebacate. Further suitable are trimellitic acid esters, such as tri-2-ethylhexyl trimellitate, triisotridecyl trimellitate, triisooctyl trimellitate and also trimellitic acid esters having from 6 to 8, 6 to 10, 7 to 9 or 9 to 11 carbon atoms in the ester group or mixtures of two or more of the mentioned compounds.

Additional suitable plasticisers are known to those skilled in the art, and include, by way of example only, phosphoric acid esters including tributyl phosphate, tri-2-ethylbutyl phosphate, tri-2-ethylhexyl phosphate, trichloroethyl phosphate, 2-ethyl-hexyl-di-phenyl phosphate, triphenyl phosphate, tricresyl phosphate or trixylenyl phosphate, or mixtures of two or more thereof, chlorinated hydrocarbons (paraffins) or hydrocarbons.

A stabilizer composition according to the invention can comprise the described plasticisers in an amount of from 0 up to about 99.5% by weight, especially up to about 30% by weight, up to about 20% by weight or up to about 10% by weight. Within the scope of a preferred embodiment of the present invention, the lower limit for the described plasticisers as constituent of the stabilizer compositions according to the invention is about 0.1% by weight or more, for example about 0.5% by weight, 1% by weight, 2% by weight or 5% by weight.

A stabilizer composition according to the invention may, for example, comprise only one of the metal salts of the compounds of formula I. In the context of the present invention it is however also contemplated that the stabilizer composition according to the invention comprises a mixture of two or more of the above-mentioned metal salt compounds. It may be a mixture of two or more different types of salts.

Similarly, the stabilizer composition of the invention may comprise one or more of the above described additives, including one or more of the same type of additives or compound.

In specific embodiments of the invention, the hydroquinone compound or a mixture of two or more such hydroquinone compounds is finely distributed in the stabilizer composition. The term "finely distributed", as used in this context, means that discrete particles of the compound or of a mixture of two or more such compounds, insofar as being present or identifiable at all, do not exceed an average particle size of 10 μm, 5 μm or 1 μm. Customary methods, such as light microscopy or electron microscopy, can be used for determining the particle size.

In various embodiments, less than 10% by weight of the compounds of formula I are in crystalline form with crystallites of a size of 30 μm or more, 20 μm or more, or 10 or more. The crystallite sizes can in principle be determined by any methods of determining particle sizes. Methods that are suitable in principle include, for example, screening methods, sedimentation methods and methods based on the diffraction or refraction of electromagnetic waves, especially of light. Also suitable are electron microscopic methods, such as scanning electron microscopy or transmission electron microscopy.

The proportion of a compound of formula I or of a mixture of two or more of these compounds in the stabilizer composition according to the invention is in total from about 0.1 to 100% by weight, from about 1 to 75% by weight, from about 2 to 50% by weight, or from about 3 to about 25% by weight of the stabilizer composition.

The stabilizer compositions of the invention can comprise, consist essentially of or consist of the above-described components.

In order to process halogen-containing polymers with the stabilizer composition according to the invention, the processes known from the prior art can be used. Examples of such processes include, but are not limited thereto, calendering, extrusion, injection molding, blow molding and the like.

The stabilizer compositions according to the invention are suitable for the stabilization of halogen-containing polymers. The present invention therefore relates also to a polymer composition comprising a halogen-containing polymer or a mixture of two or more halogen-containing polymers and a stabilizer composition according to the invention.

Examples of such halogen-containing polymers are polymers of vinyl chloride, vinyl resins containing vinyl chloride units in the polymer backbone, copolymers of vinyl chloride and vinyl esters of aliphatic acids, especially vinyl acetate, copolymers of vinyl chloride with esters of acrylic and methacrylic acid or acrylonitrile or mixtures of two or more thereof, copolymers of vinyl chloride with diene compounds or unsaturated dicarboxylic acids or anhydrides thereof, for example copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and other compounds such as acrolein, crotonaldehyde, vinyl methyl ketone, vinyl methyl ether, vinyl isobutyl ether and the like, polymers and copolymers of vinylidene chloride with vinyl chloride and other polymerisable compounds, such as those already mentioned above, polymers of vinyl chloroacetate and dichlorodivinyl ether, chlorinated polymers of vinyl acetate, chlorinated polymeric esters of acrylic acid and [alpha]-substituted acrylic acids, chlorinated polystyrenes, for example polydichlorostyrene, chlorinated polymers of ethylene, polymers and post-chlorinated polymers of chlorobutadiene and copolymers thereof with vinyl chloride and also mixtures of two or more of the mentioned polymers or polymer mixtures that contain one or more of the above-mentioned polymers. Within the scope of a preferred embodiment of the present invention, the stabilizer compositions according to the invention are used for the production of moulded articles of PVC-U, such as window profiles, industrial profiles, tubes, pipes, fittings and plates.

Also suitable for stabilization with the stabilizer compositions according to the invention are the graft polymers of PVC with EVA, ABS or MBS. Preferred substrates for such graft copolymers are also the afore-mentioned homo- and co-polymers, especially mixtures of vinyl chloride homopolymers with other thermoplastic or elastomeric polymers, especially blends with ABS, MBS, NBR, SAN, EVA, CPE; MBAS, PM (polyalkyl acrylate), PAMA (polyalkyl methacrylate, especially PMMA-polymethyl methacrylate), EPDM, polyamides or polylactones.

Likewise suitable for stabilization with the stabilizer compositions according to the invention are mixtures of halogenated and non-halogenated polymers, for example mixtures of the above-mentioned non-halogenated polymers with PVC, especially mixtures of polyurethanes and PVC.

Furthermore, it is also possible for recyclates of chlorine-containing polymers to be stabilized with the stabilizer compositions according to the invention, in principle any recyclates of the above-mentioned halogenated polymers being suitable for this purpose. PVC recyclate, for example, is suitable in the context of the present invention.

Within the scope of a preferred embodiment of the present invention, a polymer composition according to the invention comprises the stabilizer composition according to the invention in an amount of from 0.1 to 20 phr, especially from approximately 0.5 to approximately 15 phr or from approximately 1 to approximately 12 phr. The unit phr represents "per hundred resin" and thus relates to parts by weight per 100 parts by weight of polymer.

A polymer composition according to the invention preferably comprises as halogenated polymer at least a proportion of PVC, the PVC content being especially at least about 20% by weight, preferably at least about 50% by weight, for example at least about 80% by weight or at least about 90% by weight.

The polymer compositions of the invention can additionally comprise one or more of the additives described above in relation to the stabilizer compositions. These additives can be added to the polymer composition as part of the stabilizer composition or separately in any desired order, i.e. before, simultaneously with or after addition of the stabilizer composition.

The present invention relates also to a method of stabilizing halogen-containing polymers in which a halogen-containing polymer or a mixture of two or more halogen-containing polymers or a mixture of one or more halogen-containing polymers and one or more halogen-free polymers is contacted, for example mixed, with a stabilizer composition according to the invention. This method of stabilizing halogen-containing polymers includes the reduction or prevention of photoblueing. "Reduction", as used in this context, relates to a detectable decrease in color change compared to the color change of a polymer not containing the stabilizers of the present invention. Using the Lab color space, the reduction of photoblueing may be expressed as a decrease in the change of the b value. The reduction may be in the range of about 10% to about 100%. Similarly, "prevention", as used in this context, relates to essentially no detectable change in color of the polymer upon irradiation with light.

Similarly, the invention also concerns the use of a stabilizer composition according to the invention for stabilizing halogen-containing polymers, in particular for reducing or preventing photoblueing of halogen-containing polymers.

The mixing together of polymer or polymers and the stabilizer composition according to the invention can in principle be effected at any time before or during the processing of the polymer. For example, the stabilizer composition can be mixed into the powdery or granular polymer prior to processing. It is equally possible, however, to add the stabilizer composition to the polymer or polymers in the softened or molten state, for example during processing in an extruder, in the form of an emulsion or dispersion, in the form of a pasty mixture or in the form of a dry mixture.

A polymer composition according to the invention can be brought into a desired form in known manner. Suitable methods are, for example, calendering, extrusion, injection-molding, sintering, extrusion blowing or the plastisol process. A polymer composition according to the invention can also be used, for example, in the production of foamed materials. In principle, the polymer compositions according to the invention are suitable for the production of hard or soft PVC, including for the production of PVC foams.

A polymer composition according to the invention can be processed to form molded articles. The present invention therefore relates also to molded articles comprising a stabilizer composition according to the invention or a polymer composition according to the invention or consisting of a polymer composition according to the invention.

The term "molded article" in the context of the present invention in principle includes any three-dimensional structures that can be produced from a polymer composition according to the invention. In the context of the present invention the term "molded article" includes, for example, wire sheathings, automobile components, for example automobile components such as are used in the interior of the automobile, in the engine space or on the outer surfaces, cable insulations, decorative films, agricultural films, hoses, shaped sealing elements, office films, hollow bodies (bottles), packaging films (deep-draw films), blown films, tubes, pipes, foamed materials, heavy duty profiles (window frames), light wall profiles, structural profiles, sidings, fittings, plates, foamed panels, co-extrudates having a recycled core, or housings for electrical apparatus or machinery, for example computers or household appliances.

Further examples of molded articles that can be produced from a polymer composition according to the invention are synthetic leather, floor coverings, textile coatings, wall coverings, coil coatings and underseals for motor vehicles. The molded articles are preferably those that are exposed to light, in particular sunlight, upon use. One specific example for such articles are window profiles.

The citing or discussion of a previously published document in this application should not necessarily be taken as an acknowledgement that the document is part of the state of the art or is common general knowledge. All documents listed are hereby incorporated herein by reference in their entirety.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognise that the invention is also thereby described in terms of any individual member or subgroup of members of the Markush group. The invention is illustrated in more detail by the following examples, but without being limited thereto

EXAMPLES

The polymer mixtures of the following examples were homogenised in a hot mixer heating the mixtures up to 120° C. by friction in the course of 5 min, thereafter stored for 24 h and subsequently extruded on a parallel 25 mm twin-screw extruder from Gottfert. Directly after the extrusion the sample specimen were covered to prevent to be irradiated before the weathering experiments.

Extruded strip specimen were artificially weathered for 168 hours in a Bandol Wheel® (see for example http://web.lerelaisinternet.com/stationdebandol/english/sevar_english.htm), which is well-known in the art, using the following conditions: one cycle per hour, 120° of the cycle shaded, 120° of the cycle in a water tank with distilled water, (in each case 60° of the shading are in the air and in dist. water, respectively), 50° C. ambient temperature in the in the sample area and 400 W mercury medium pressure lamp.

The b*-color values of the samples at different states of the weathering/irradiation were determined using a spectrophotometer MINOLTA CM-2002 (illuminant D65, observer angle 10°).

The polymer mixtures as listed in Tab. 1 were prepared as described. The ingredient amounts are expressed in parts per 100 parts by weight of PVC (phr). Examples 1 and 4 are comparative examples. Examples 2 and 5 as well as examples 3 and 6 are according to the invention.

TABLE 1

Polymer compositions of examples 1 to 6, examples 1 and 4 are comparative examples only

| Ingredient | Examples | | | | | |
|---|---|---|---|---|---|---|
| | 1 | 2 | 3 | 4 | 5 | 6 |
| PVC (k = 67) | 100.00 | 100.00 | 100.00 | 100.00 | 100.00 | 100.00 |
| Calcium Carbonate | 12.00 | 12.00 | 12.00 | 12.00 | 12.00 | 12.00 |
| High Impact Acrylate | 6.00 | 6.00 | 6.00 | 6.00 | 6.00 | 6.00 |
| Acrylic Processing Aid | 0.60 | 0.60 | 0.60 | 0.50 | 0.50 | 0.50 |
| Titanium Dioxide | 3.50 | 3.50 | 3.50 | 3.70 | 3.70 | 3.70 |
| Zn-Stearate | 0.75 | 0.75 | 0.75 | 0.55 | 0.55 | 0.55 |
| Ca-Stearate | 0.30 | 0.30 | 0.30 | 0.50 | 0.50 | 0.50 |
| THEIC | 0.15 | 0.15 | 0.15 | 0.20 | 0.20 | 0.20 |
| Mg—Al-Hydrotalcit Complex | 0.50 | 0.50 | 0.50 | 0.55 | 0.55 | 0.55 |
| Ester wax | 0.15 | 0.15 | 0.15 | 0.15 | 0.15 | 0.15 |
| PE-wax | 0.10 | 0.10 | 0.10 | 0.05 | 0.05 | 0.05 |
| Ca-Acetyl-acetonate | 0.20 | 0.20 | 0.20 | 0.15 | 0.15 | 0.15 |
| 12-Hydroxy-stearic Acid | | | | 0.10 | 0.10 | 0.10 |
| Glycerintri-stearate | 0.30 | 0.30 | 0.30 | 0.35 | 0.35 | 0.35 |
| Antioxidant (Irg 1076) | 0.08 | 0.08 | 0.08 | 0.10 | 0.10 | 0.10 |
| organic Phosphite | | | | 0.07 | 0.07 | 0.07 |
| Hydroquinone | | 0.015 | | | 0.015 | |
| 2-Methyl-Hydroquinone | | | 0.017 | | | 0.017 |

Example 1 is a formulation without the inventive additives. As obvious in Tab. 2 the b-value of the specimen drops substantially with time of weathering and irradiation. Such a drop in b-value is described as photoblueing.

Example 2 is the same formulation as example 1 with additionally 0.015 phr of hydroquinone—one of the inventive compounds described above. The relative decrease of the b-value is substantially reduced.

Example 3 is also the same formulation as example 1 with additionally 0.017 phr of 2-methyl-hydroquinone. Again, a substantial reduction of the decrease of the b-value was observed.

Example 4 is another comparative example without the inventive hydroquinone compounds with different additives/lubricants compared to example 1. Here a decrease of the b-value is also observed. Examples 5 and 6 are based on the formulation of example 4.

Example 5 is based on the formulation of example 4 and in addition contains hydroquinone. No decrease of the b-value is observed, but instead a small initial increase in b-value was observed which is reduced after some days (Tab. 2).

Example 6 is also based on the formulation of example 4 and in addition contains 2-methyl-hydroquinone. Again, no photoblueing is observed (Tab. 2).

TABLE 2

Delta b-values as difference and as percentage of initial b-value over time (hours) of artificial weathering in a Bandol Wheel ®

| | Time of artificial weathering in Bandol Wheel | Results of examples | | | | | |
|---|---|---|---|---|---|---|---|
| | (h) | 1 | 2 | 3 | 4 | 5 | 6 |
| Delta b-value | 24 | −0.65 | 0.16 | 0.35 | −0.44 | 0.31 | 0.53 |
| | 48 | −0.82 | 0.02 | −0.03 | −0.6 | 0.31 | 0.4 |
| | 72 | −0.92 | −0.17 | −0.68 | −0.69 | 0.21 | 0.11 |
| | 144 | −0.7 | −0.15 | −0.69 | −0.74 | 0.09 | −0.26 |
| | 168 | −0.59 | −0.08 | −0.58 | −0.73 | 0.07 | −0.3 |
| Delta b in % | 24 | −17% | 4% | 8% | −16% | 10% | 16% |
| | 48 | −22% | 0% | −1% | −21% | 10% | 12% |
| | 72 | −25% | −4% | −15% | −24% | 7% | 3% |
| | 144 | −19% | −4% | −15% | −26% | 3% | −8% |
| | 168 | −16% | −2% | −13% | −26% | 2% | −9% |

The invention claimed is:

1. Method for reducing or preventing photoblueing of a halogen-containing polymer, comprising contacting the halogen-containing polymer with a stabilizer composition comprising:

at least one hydroquinone compound of formula I:

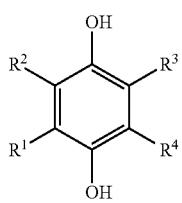

Formula I wherein
$R^1$, $R^2$, $R^3$ and $R^4$ are independently selected from the group consisting of hydrogen, halogen, hydroxy, nitro, sulfonyl, phosphoryl, optionally substituted alkyl, optionally substituted alkenyl, optionally substituted alkynyl, optionally substituted cycloalkyl, optionally substituted heterocyclyl, optionally substituted aryl, optionally substituted heteroaryl, optionally substituted alkoxy, and —C(O)R, and —NR'R";

R is selected from the group consisting of hydrogen, hydroxy, alkyl, alkenyl, alkynyl, alkoxy, aryl, heteroaryl, cycloalkyl, heterocyclyl, and —NR'R"; and R' and R" are independently selected from the group consisting of hydrogen, alkyl, alkenyl, alkynyl, aryl, heteroaryl, cycloalkyl, and heterocyclyl, wherein the hydroquinone compound develops a yellow color upon exposure to light, and wherein the stabilizer composition is present in an amount such that the yellow color of the hydroquinone compound which develops upon exposure to light reduces or prevents photoblueing of the halogen-containing polymer.

2. The method of claim 1, wherein the stabilizer composition is added to the halogen-containing polymer before curing.

3. The method according to claim 1, wherein the halogen-containing polymer is polyvinylchloride.

4. The method of claim 1, wherein $R^1$-$R^4$ are hydrogen or alkyl.

5. The method of claim 1, wherein one or two of $R^1$-$R^4$ are alkyl and the others are hydrogen.

6. The method of claim 5, wherein the hydroquinone compound of formula I is selected from the group consisting of hydroquinone, 2-methyl-hydroquinone and 2,5-di-tert-butyl-hydroquinone.

7. The method of claim 1, wherein the stabilizer composition further comprises at least one additional stabilizer compound for halogen-containing polymers.

8. The method of claim 7, wherein the at least one additional stabilizers is selected from the group consisting of 1,3-diketone compounds, polyols, metal salts, natural or synthetic minerals, organic esters of phosphorous acid, epoxy compounds, salts of halogen-containing oxy acids, nitrogen-containing compounds, and combinations thereof.

9. The method of claim 8, wherein the at least one additional stabilizer is selected from the group consisting of hydrotalcites, perchlorates, alkaline earth metal oxides, hydroxides and carboxylates, amino acid derivatives, amino alcohols, aminouracils and isocyanurates.

10. The method of claim 1, further comprising one or more additional components selected from the group consisting of zeolites, antioxidants, fillers, plasticizers, dyestuffs, pigments, antistatic agents, surfactants, blowing agents, impact modifiers, UV stabilizers, lubricants, processing agents and other auxiliaries.

11. The method of claim 1, wherein the stabilizers composition comprises titanium dioxide.

12. The method of claim 1, wherein the halogen-containing polymer is a thermoplastic.

* * * * *